(12) United States Patent
Andersen

(10) Patent No.: US 10,316,602 B2
(45) Date of Patent: Jun. 11, 2019

(54) DOWNHOLE MACHINING SYSTEM AND METHOD

(71) Applicant: WELLTEC A/S, Allerød (DK)

(72) Inventor: Tomas Sune Andersen, Helsingør (DK)

(73) Assignee: Welltec A/S, Allerød (DK)

( * ) Notice: Subject to any disclaimer, the term of this patent is extended or adjusted under 35 U.S.C. 154(b) by 626 days.

(21) Appl. No.: 14/894,319

(22) PCT Filed: Jun. 13, 2014

(86) PCT No.: PCT/EP2014/062387
§ 371 (c)(1),
(2) Date: Nov. 25, 2015

(87) PCT Pub. No.: WO2014/198897
PCT Pub. Date: Dec. 18, 2014

(65) Prior Publication Data
US 2016/0130904 A1   May 12, 2016

(30) Foreign Application Priority Data
Jun. 14, 2013   (EP) .................................... 13172046

(51) Int. Cl.
*E21B 4/18*   (2006.01)
*E21B 29/00*   (2006.01)
(Continued)

(52) U.S. Cl.
CPC ............... *E21B 29/06* (2013.01); *B23C 3/00* (2013.01); *E21B 4/18* (2013.01); *E21B 29/005* (2013.01); *B23C 2215/64* (2013.01)

(58) Field of Classification Search
CPC .......... E21B 4/18; E21B 29/005; E21B 29/06; B23C 3/00; B23C 2215/64
See application file for complete search history.

(56) References Cited

U.S. PATENT DOCUMENTS 3,859,877 A * 1/1975 Sherer .................... B23B 29/02
                                                        82/100
4,577,388 A * 3/1986 Wood ...................... B23D 21/02
                                                        166/55
(Continued)

FOREIGN PATENT DOCUMENTS

CN          1413285 A      4/2003
CN       101479441 A      7/2009
(Continued)

OTHER PUBLICATIONS

Office Action of Substantive Examination dated Sep. 28, 2017 in Russian Application No. 2015153172/03(081975) with English Translation (12 pages).
(Continued)

*Primary Examiner* — Matthew R Buck
(74) *Attorney, Agent, or Firm* — Nixon & Vanderhye P.C.

(57) ABSTRACT

The present invention relates to a downhole machining system (1) for machining a casing (2) in a borehole in a well having a top. The downhole machining system comprises a first tool part (4) having an axial extension (5) and an anchoring section (6); a second tool part (7) adapted to rotate and move axially in relation to the first tool part, the second tool part comprising a machining bit (8) being movable in a direction radial in relation to the axial extension; a first actuator (10) comprising an electrical motor (11A) for axially moving the second tool part in relation to the first tool part; a second actuator (12) comprising an electrical motor (13) for rotating the second tool part in relation to the first tool part; and a third actuator (14) comprising an electrical motor (11b) for rotating the bit. At least one of the actuators comprises a gear (15) for changing a rotational speed of a rotor of the motor.

21 Claims, 11 Drawing Sheets

(51) Int. Cl.
*E21B 29/06* (2006.01)
*B23C 3/00* (2006.01)

(56) References Cited

U.S. PATENT DOCUMENTS

| | | | | |
|---|---|---|---|---|
| 4,648,454 A * | 3/1987 | Yarnell | ............... | B23B 41/00 |
| | | | | 166/297 |
| 6,012,526 A * | 1/2000 | Jennings | ............... | E21B 7/061 |
| | | | | 166/297 |
| 6,772,839 B1 * | 8/2004 | Bond | ............... | E21B 23/04 |
| | | | | 166/100 |
| 7,249,918 B1 * | 7/2007 | Bowman | ............... | B23C 1/20 |
| | | | | 166/55.2 |
| 7,562,700 B2 * | 7/2009 | Lewis | ............... | E21B 29/005 |
| | | | | 166/298 |
| 7,575,056 B2 * | 8/2009 | Fuhst | ............... | E21B 29/005 |
| | | | | 166/298 |
| 2012/0029702 A1 * | 2/2012 | Tverlid | ............... | E21B 29/005 |
| | | | | 700/275 |

FOREIGN PATENT DOCUMENTS

| | | |
|---|---|---|
| EP | 0 911 483 | 4/1999 |
| GB | 1 482 741 | 8/1977 |
| GB | 2 129 350 | 5/1984 |
| GB | 2 316 424 A | 2/1998 |
| GB | 2 353 812 | 3/2001 |
| RU | 2 198 997 C1 | 2/2003 |
| RU | 2 201 493 C2 | 3/2003 |
| RU | 2 333 345 C1 | 9/2008 |
| WO | WO 01/46549 A1 | 6/2001 |
| WO | WO 2007/125509 A1 | 11/2007 |
| WO | WO 2010/066276 | 6/2010 |

OTHER PUBLICATIONS

International Search Report for PCT/EP2014/062387 dated Oct. 16, 2014, five pages.
Written Opinion of the ISA for PCT/EP2014/062387 dated Oct. 16, 2014, five pages.
Notification of the First Office Action dated May 31, 2017 in Chinese Application No. 201480031141.8, with English Translation (17 pages).
Notification Concerning Transmittal of International Preliminary Report on Patentability (Chapter I of the Patent Cooperation Treaty) dated Dec. 23, 2015 in International Application No. PCT/EP2014/062387 (7 pages).

* cited by examiner

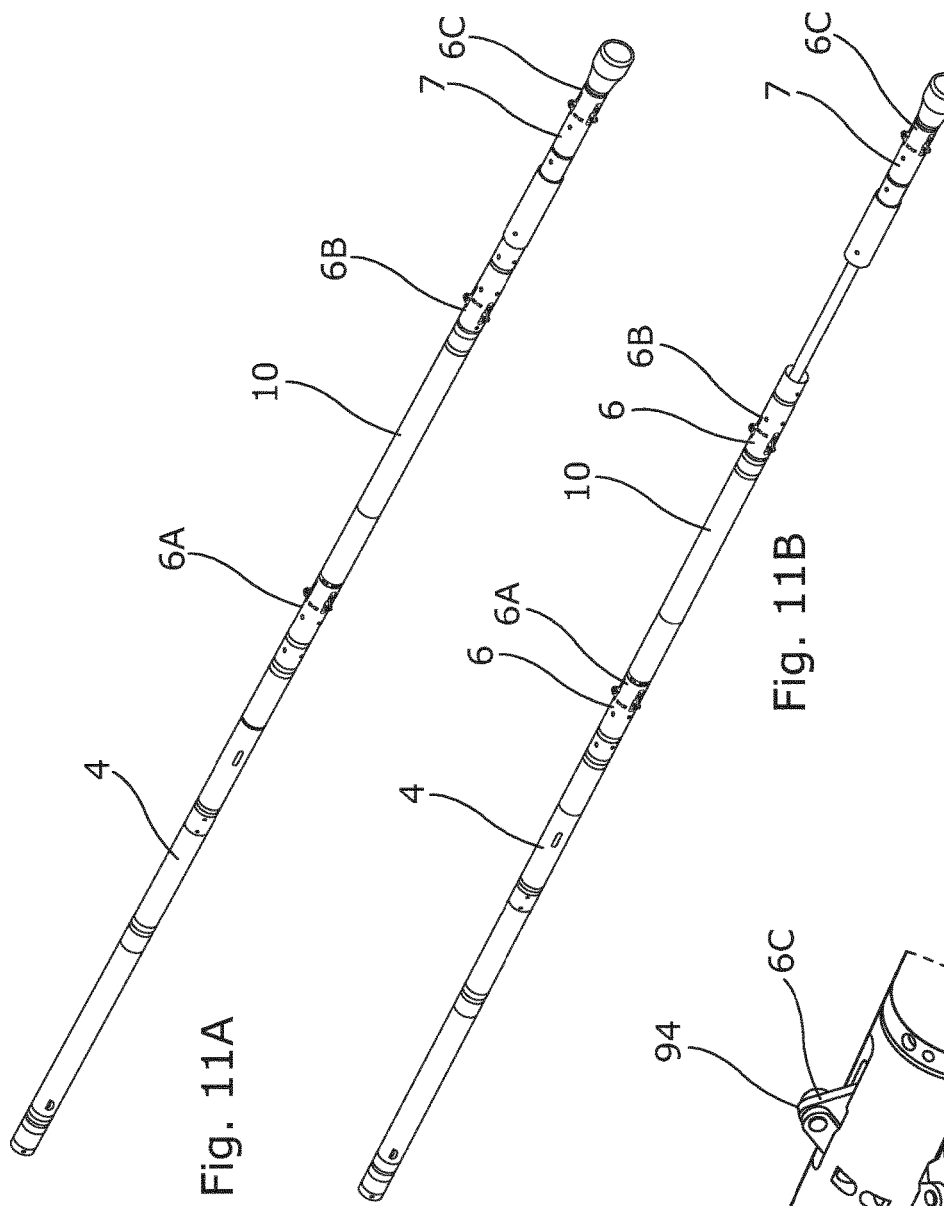

DOWNHOLE MACHINING SYSTEM AND METHOD

This application is the U.S. national phase of International Application No. PCT/EP2014/062387 filed 13 Jun. 2014 which designated the U.S. and claims priority to EP 13172046.8 filed 14 Jun. 2013, the entire contents of each of which are hereby incorporated by reference.

FIELD OF THE INVENTION

The present invention relates to a downhole machining system for machining a casing in a borehole in a well having a top. Furthermore, the invention relates to a machining method.

BACKGROUND ART

Well technology constantly develops, and the smart completion technology has traditionally been in focus. However, changes need to be made to a well during its lifetime in order to optimise production, and these changes are not always predictable and can thereby not be taken into account when assembling the casing. One necessary change could be machining an opening in the casing in order to insert a control valve to initiate gas lift. Another change required could be to machine a larger opening in the casing in order to make a side track. However, when making larger holes, elongated holes or just holes different from the size of the bit, the machining technology CNC from sub surface cannot be used as this technology requires a lot of space and power which is limited downhole.

SUMMARY OF THE INVENTION

It is an object of the present invention to wholly or partly overcome the above disadvantages and drawbacks of the prior art. More specifically, it is an object to provide an improved downhole tool capable of machining a casing in a predetermined position and of machining a predetermined geometry of the hole even though space and power is limited downhole.

The above objects, together with numerous other objects, advantages and features, which will become evident from the below description, are accomplished by a solution in accordance with the present invention by a downhole machining system for machining a casing in a borehole in a well having a top, comprising:
- a first tool part having an axial extension and an anchoring section,
- a second tool part adapted to rotate and move axially in relation to the first tool part, the second tool part comprising a machining bit being movable in a direction radial in relation to the axial extension,
- a first actuator comprising an electrical motor for axially moving the second tool part in relation to the first tool part,
- a second actuator comprising an electrical motor for rotating the second tool part in relation to the first tool part, and
- a third actuator comprising an electrical motor for rotating the bit, wherein at least one of the actuators comprises a gear for changing a rotational speed of a rotor of the motor.

In one embodiment, the gear may be a reduction gear.

Furthermore, the first tool part may be arranged closer to the top of the well than the second tool part.

Additionally, the system may comprise a second anchoring section, and the anchoring sections may be arranged with a mutual axial distance between them, both anchoring sections being arranged closer to the top of the well than the second tool part and the bit.

The downhole machining system may further comprise two anchoring sections arranged with a mutual axial distance between them, both of the two anchoring sections being arranged closer to the top of the well than the second tool part.

Moreover, the bit may not be arranged between the anchoring sections.

In an embodiment, the gear of the third actuator may be a bevel gear.

Also, the gear of the second actuator may be a planetary gear.

Further, the gear of the first actuator may be a planetary gear.

Additionally, the bit may be moved radially in relation to the axial extension by means of an electrical motor and/or hydraulics.

Furthermore, the bit may be moved radially by means of a hydraulic cylinder.

Moreover, the bit may form a piston of the hydraulic cylinder.

Furthermore, one anchoring section may be axially movable in relation to the other.

The system may further comprise a driving unit for propelling the system forward in the well.

In an embodiment, the first actuator may comprise a hydraulic cylinder instead of the motor.

Furthermore, the downhole machining system may comprise a control unit for controlling the actuators.

Moreover, the control unit may be arranged in the first tool part or the second tool part.

In addition, the control unit may be arranged at the top of the well.

In one embodiment of the invention, the downhole machining system may further comprise a pinching or cutting tool projectable through an opening in the casing provided by the machining bit.

Furthermore, the downhole machining system may further comprise a bit magazine.

Additionally, the downhole machining system may further comprise a fluid cleaner.

Also, the downhole machining system may further comprise a plug setting tool.

In another embodiment, the bit may be moved radially in a bit housing, the bit may have a sharp end facing the casing and a piston end, and the bit may be moved radially in relation to the axial extension by means of an electrical motor driving a hydraulic cylinder being in fluid communication with the bit housing pressing onto the piston end.

The downhole machining system as described above may further comprise a fluid cleaner for cleaning up cuttings from the machining process.

Moreover, the downhole machining system as described above may further comprise a plug setting tool for subsequently setting a plug.

By having a plug setting tool, the well can be cemented shortly after the downhole machining system has been retracted from the well.

Furthermore, the downhole machining system as described above may further comprise a pinching or cutting tool adapted to project through an opening in the casing provided by the bit.

Also, the first actuator may be a hydraulic cylinder which is a stroker tool.

Further, the bit may be rotated via gears by means of a main shaft which is rotated by the motor.

In addition, the main shaft may be connected with an angular gear for rotating the bit.

Moreover, a first gear of the angular gear may be connected to the main shaft and a second gear of the angular gear may be connected to a bit housing.

The present invention furthermore relates to a machining method comprising the following steps:
- inserting the downhole machining system according to any of the preceding claims into the casing,
- anchoring the system in the casing,
- moving the second tool part in relation to the first tool part,
- moving the machining bit radially in relation the axial extension, and
- machining the casing by means of the bit.

Said machining method may further comprise the step of moving the second tool part and the bit axially and/or rotate the second tool part and the bit during the machining step in order to provide an opening in the casing, said opening being larger than a diameter of the bit.

In an embodiment, the machining step may be performed to provide an opening in the casing, and the method may further comprise the step of projecting an operation tool into the opening.

Finally, the machining may be conventional milling/up-milling or down milling/climb milling.

BRIEF DESCRIPTION OF THE DRAWINGS

The invention and its many advantages will be described in more detail below with reference to the accompanying schematic drawings, which for the purpose of illustration show some non-limiting embodiments and in which FIG. 11a shows the downhole machining system in perspective, FIG. 11b shows the downhole machining system in perspective and in another position, and FIG. 11c shows an enlarged view of part of the downhole machining system.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
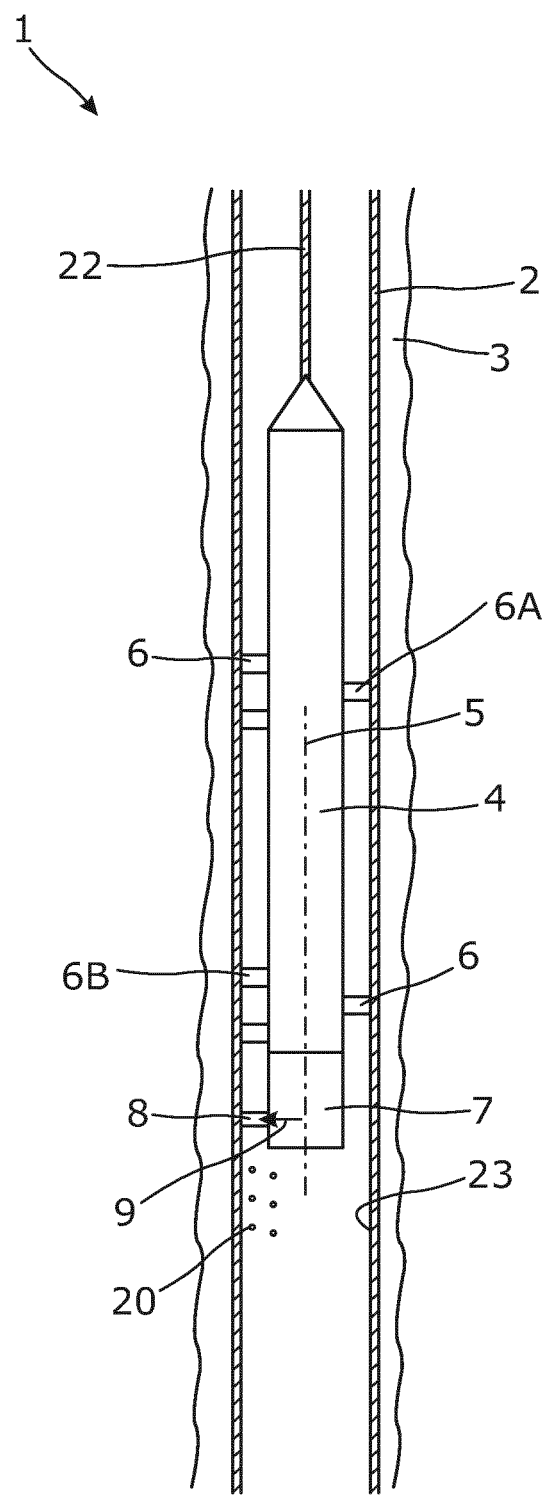
FIG. 1 shows a downhole machining system anchored in a casing.

FIG. 1 shows a downhole machining system 1 for machining a casing 2 in a borehole 3 downhole by means of a bit 8. Machining a casing can be done for a number a reasons, e.g. to make an opening in the casing for inserting a valve or for cutting a control line. The downhole machining system 1 comprises a first tool part 4 having an axial extension 5 and an anchoring section 6 for anchoring the tool in a predetermined position in the casing in order to perform the machining operation. The system further comprises a second tool part 7 in which the bit is arranged. The second tool part is rotatable in relation to the first tool part in order to be able to position the bit along the circumference of the casing, as illustrated by line B, and the bit is projectable from the tool part to obtain contact with an inner face 23 of the casing. After anchoring the tool, the bit is positioned in a predetermined position and is therefore either moved along and/or rotated around the axial extension 5 of the first tool part and then projected from the tool part to engage the wall of the casing.

Figure 2:
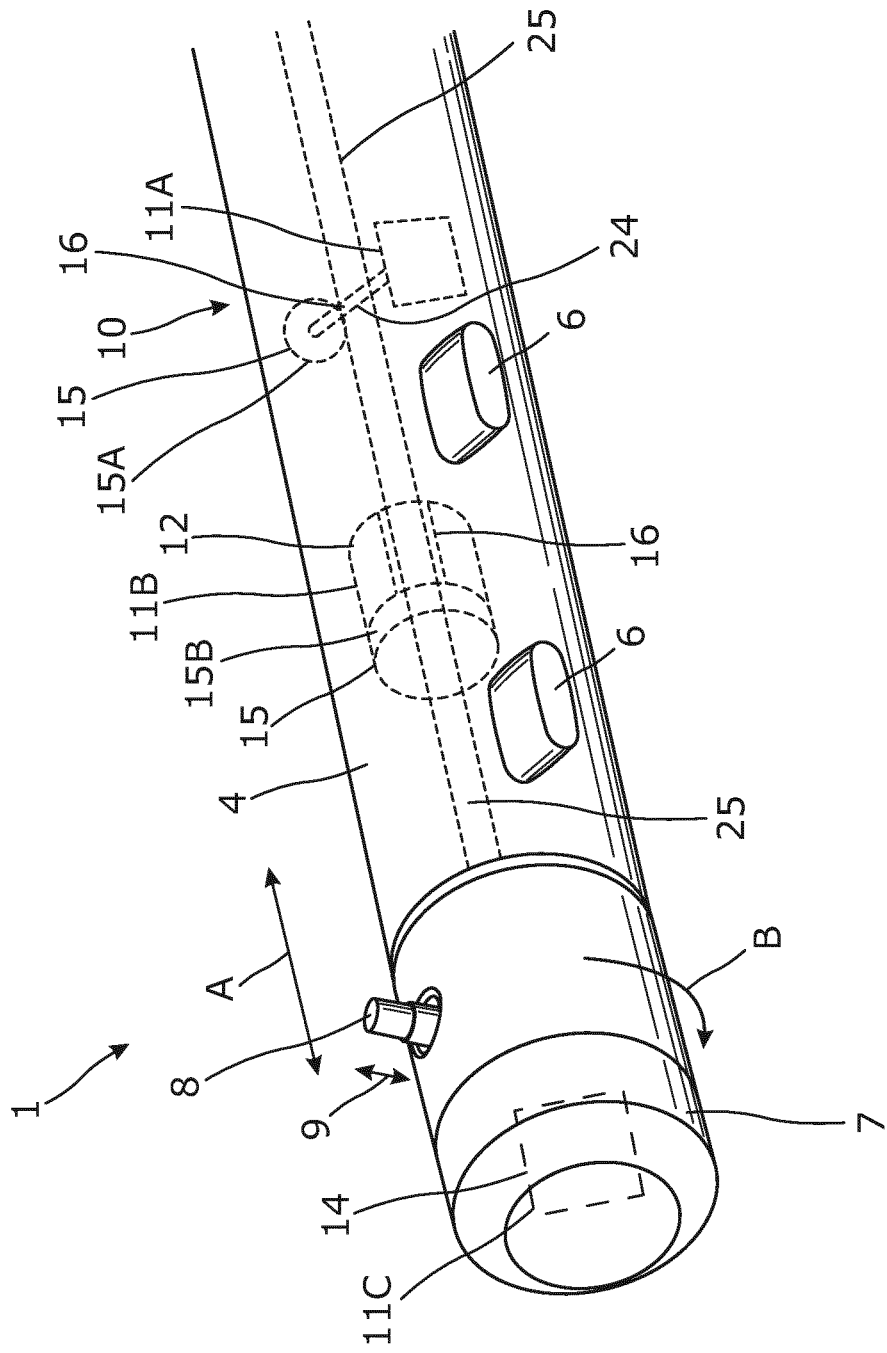
FIG. 2 shows a part of the downhole machining system in perspective.

As shown in FIG. 2, the second tool part 7 is axially movable in relation to the first tool part along arrow A by means of a first actuator 10 comprising an electrical motor 11A. The system further comprises a second actuator 12 comprising an electrical motor 11B for rotating the second tool part in relation to the first tool part. The machining bit 8 is movable in a direction 9 radial in relation to the axial extension by means of a third actuator 14 comprising an electrical motor 11C. When operating downhole through a wireline 22 (shown in FIG. 1), the amount of power is very limited, and furthermore, due to the limited amount of space in a casing, the downhole operating tool is very limited in size, and consequently, so are the motors comprised in the tool. Due to this limited motor capacity, the first and the second actuators comprise a gear 15 for changing a rotational speed of a rotor 16 (shown in FIG. 3) of the motor, and the actuators are thus capable of moving the second tool part in relation to the first tool part. Thus, the gears are required during the machining operation, while the bit engages the wall of the casing in order to be able to cut in the casing. Electrical motors small enough to be fitted into a downhole tool string are not powerful enough for driving the bit, e.g. by moving the second tool part, during the machining operation without using reduction gears.

By having several actuators, the downhole machining system is capable of machining a hole of any geometry and is thus capable of making a window which may be rectangular, round or meander-shaped. The downhole machining system is also capable of writing letters, numbers or logos by means of milling into the casing.

In FIG. 2, the first actuator 10 has an electrical motor 11A rotating a shaft 16, 24 which rotates a gear 15, 15A engaging teeth of a main shaft 25, thereby moving the main shaft and the second tool part 7 axially in relation to the first tool part 4. The second actuator 12 has an electrical motor 11B rotating the main shaft 25 through a reduction gear 15, such as a planetary gear 15B, thereby rotating the main shaft and the second tool part 7 in relation to the first tool part 4. The first and second actuators allow for the bit to be moved along the axial extension of the casing and along the circumference of the casing, and the system is thereby capable of machining an opening which is larger than the diameter of the bit.

The third actuator having an electrical motor is arranged in the second tool part to rotate the bit 8. The bit may be rotated by means of a bevel gear or via a belt solution. The bit is moved axially by means of an electrical motor and/or hydraulics, which will be explained in the following.

The gears of the actuators may be reduction gears to be able to reduce the number of rotations of the motor and provide the actuator with more torque. The gear in the third actuator may also be a gear increasing the number of rotations of the bit in relation to the electrical motor in order to obtain the optimal machining operations for the bit.

As can be seen in FIG. 1, the first tool part 4 is arranged closer to the top of the well than the second tool part 7. The first tool part 4 comprises two anchoring sections 6, 6A, 6B arranged with a mutual axial distance between them, and both anchoring sections are arranged closer to the top of the well than the machining bit 8 of the second tool part 7. Thus, the bit 8 is not arranged between the anchoring sections 6, 6A, 6B, which allows for the cuttings 20 from the machining operation to leave the machining area instead of accumulating in the area between the anchoring sections and damaging the machining operation. If the well is not to be cemented and abandoned after the operation, a cleaning tool can be submerged into the well to clean the well for cuttings. Furthermore, by having the second tool part and thus the bit arranged in front of the anchoring section 6, the bit is not restricted in its movement and is thus capable of machining a long hole in the casing if needed.

Figure 3:
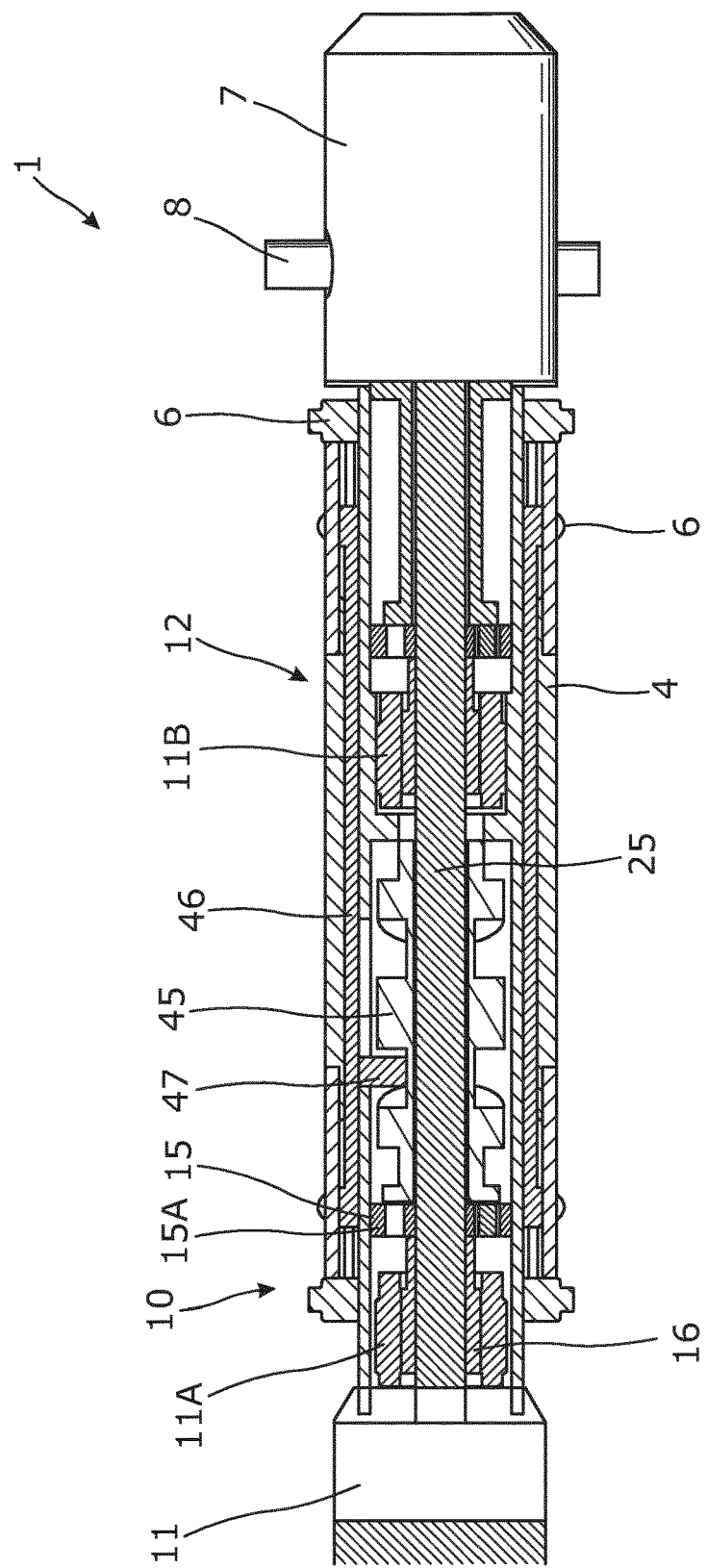
FIG. 3 shows a partly cross-sectional view of another embodiment of the downhole machining system.
Figure 10:
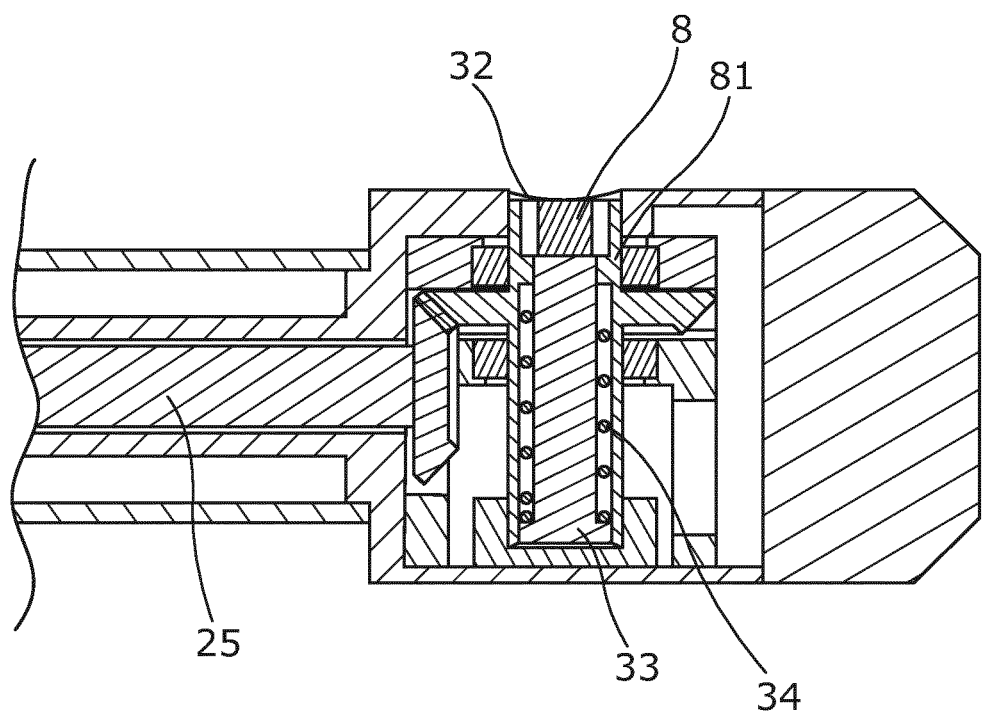
FIG. 10 shows a cross-sectional view of the part of the tool.

As shown in FIG. 3, the gear 15 of the first actuator 10 is a planetary gear 15A driving a spindle 45 engaging with the housing 46 by a projection 47 forcing the second tool part 7 to move axially in relation to first tool part 4. As can be seen, the second part 7 may comprise two bits 8, and when the first bit is worn out, the second part 7 is rotated, and the second bit can take the place of the first and continue the milling operation. The bit is rotated via gears by means of the main shaft 25 which is rotated by the motor 11, e.g. as shown in FIGS. 3 and 10, which will be described below.

Figure 4:
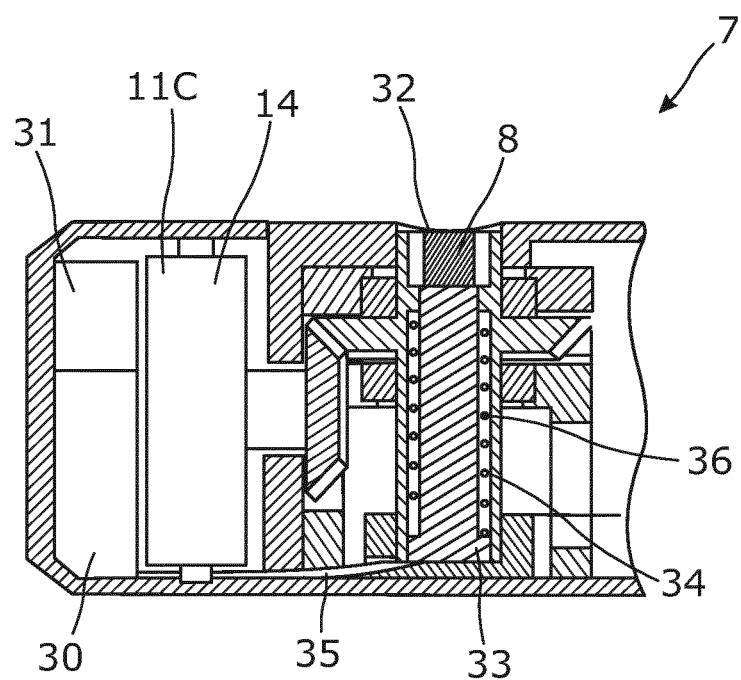
FIG. 4 shows a cross-sectional view of part of the downhole machining system.

In FIG. 4, the machining bit 8 is projected by a hydraulic cylinder 30 driven by an electrical motor 31. The bit has a sharp end 32 and a piston end 33 which is arranged slidably in a bit housing 34. The hydraulic cylinder 30 is fluidly connected with an end of the housing opposite the sharp end of the bit, and when the motor 31 drives the hydraulic cylinder 30, fluid is led through a fluid line 35 to force the bit outwards. As the piston moves, a spring 36 is compressed which retracts the bit 8 if the power breaks, allowing for retraction of the system from the well.

Figure 5:
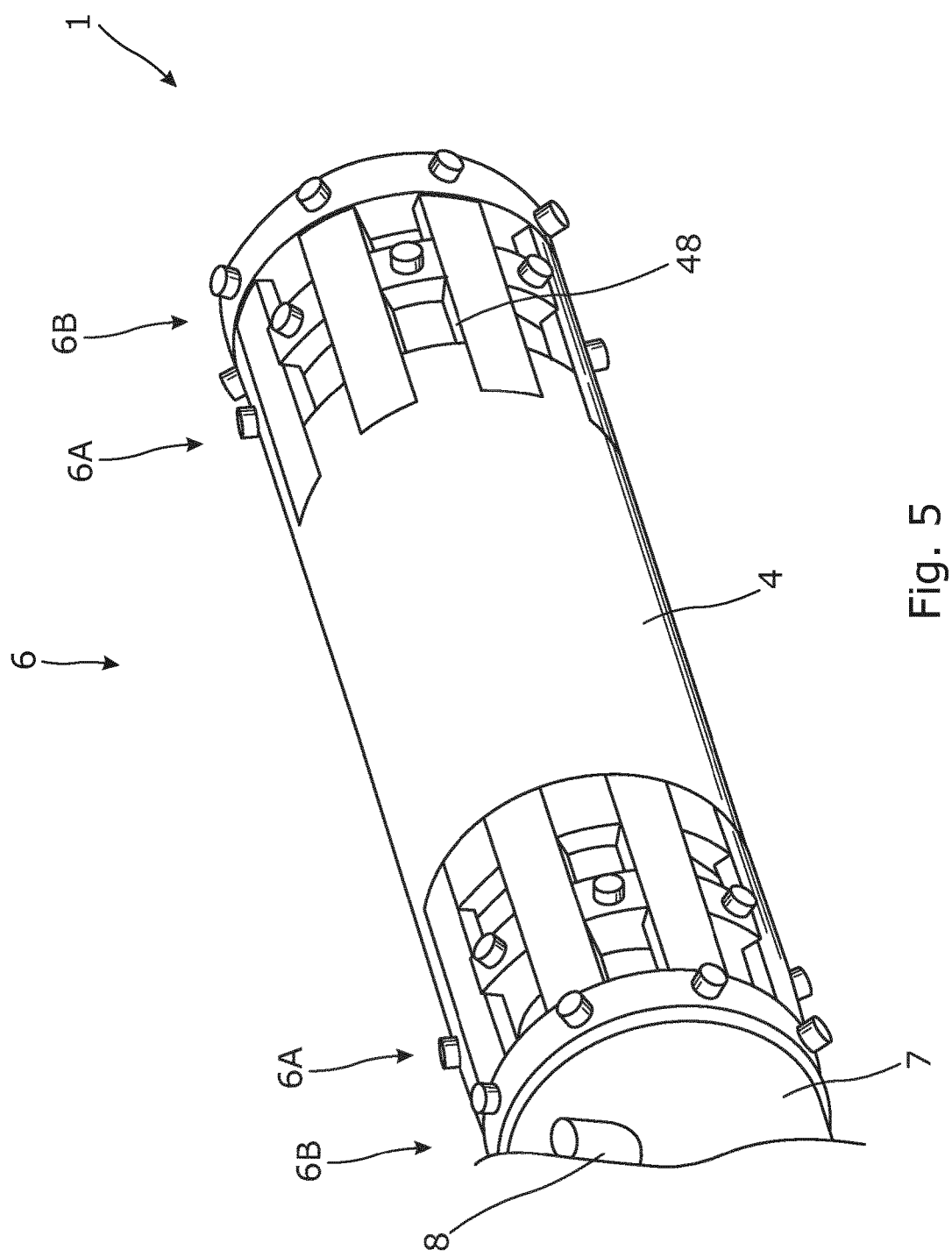
FIG. 5 shows a perspective view of a crawler system in another embodiment of the downhole machining system.

In FIG. 5, the downhole machining system 1 comprises two anchoring sections 6A, 6B which are axially movable in relation to each other, forming a crawler system. The first anchoring section 6A has projectable anchors, and the second anchoring section 6B has projectable anchors. When the first anchoring section 6A is anchoring the system in the casing, the second anchoring section 6B retracts its anchors and moves to a next position in which the anchors of the second anchoring section 6B project, anchoring the second anchoring section in the casing, and the first anchoring section then retracts its anchors and moves forward. In this way, the first anchoring section 6A acts within tracks 48 of the second anchoring section 6B, and the system thus crawls forward while the bit is machining, so that an almost endless opening can be made. Thus, the bit is capable of cutting or machining a very long opening, e.g. an almost endless elongated opening.

Figure 6:
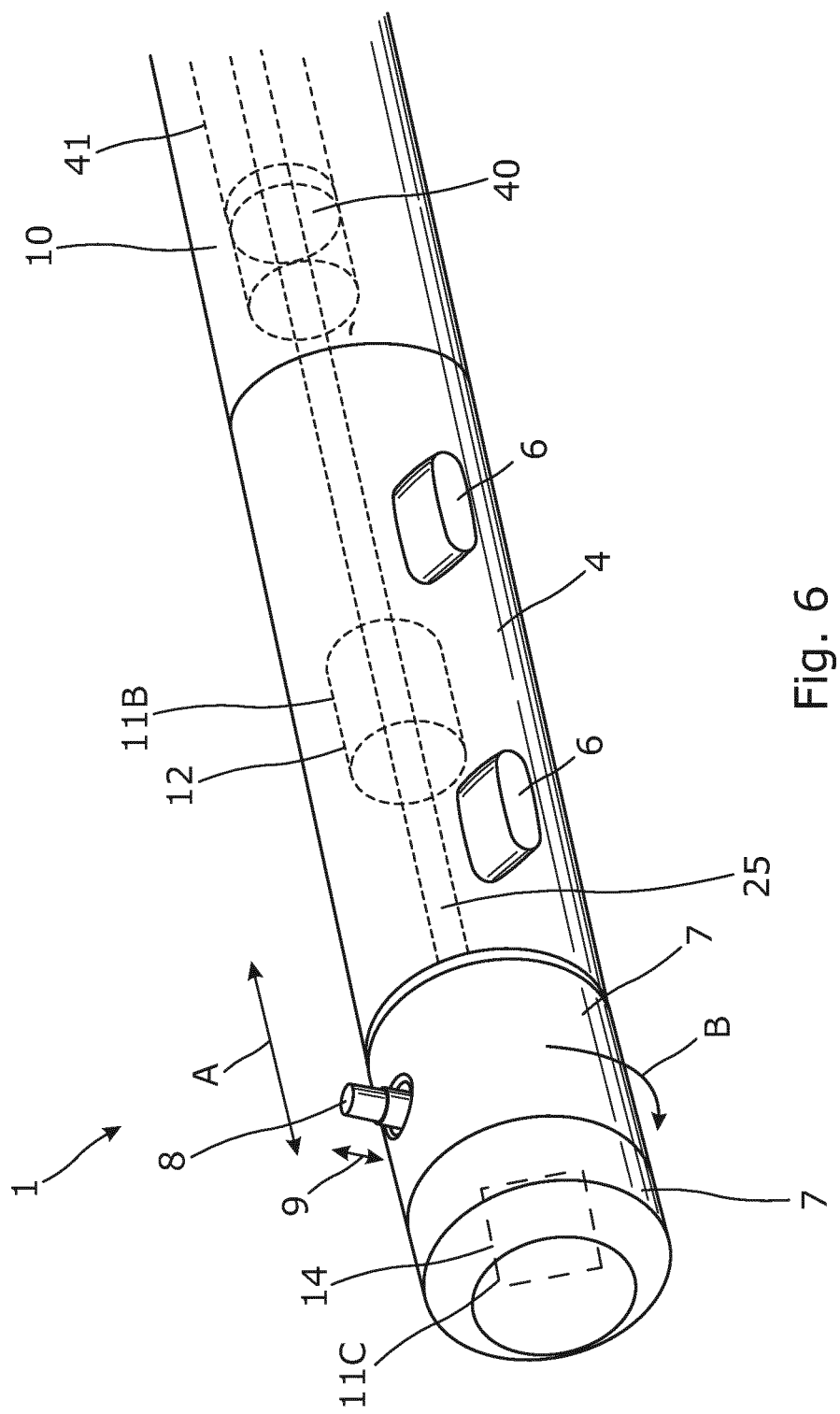
FIG. 6 shows a perspective view of another downhole machining system having a stroker tool.

In FIG. 6, the first actuator 10 comprises a hydraulic cylinder which is driven by a pump which again is driven by a motor. The hydraulic cylinder may also be called a stroker tool, in which the main shaft extends and is moved by fluid pressing onto pistons 40 arranged around the main shaft in a housing 41. In this embodiment, the elongated opening provided by the bit can be made as long as the length of the cylinder stroke in the hydraulic cylinder.

Figure 9:
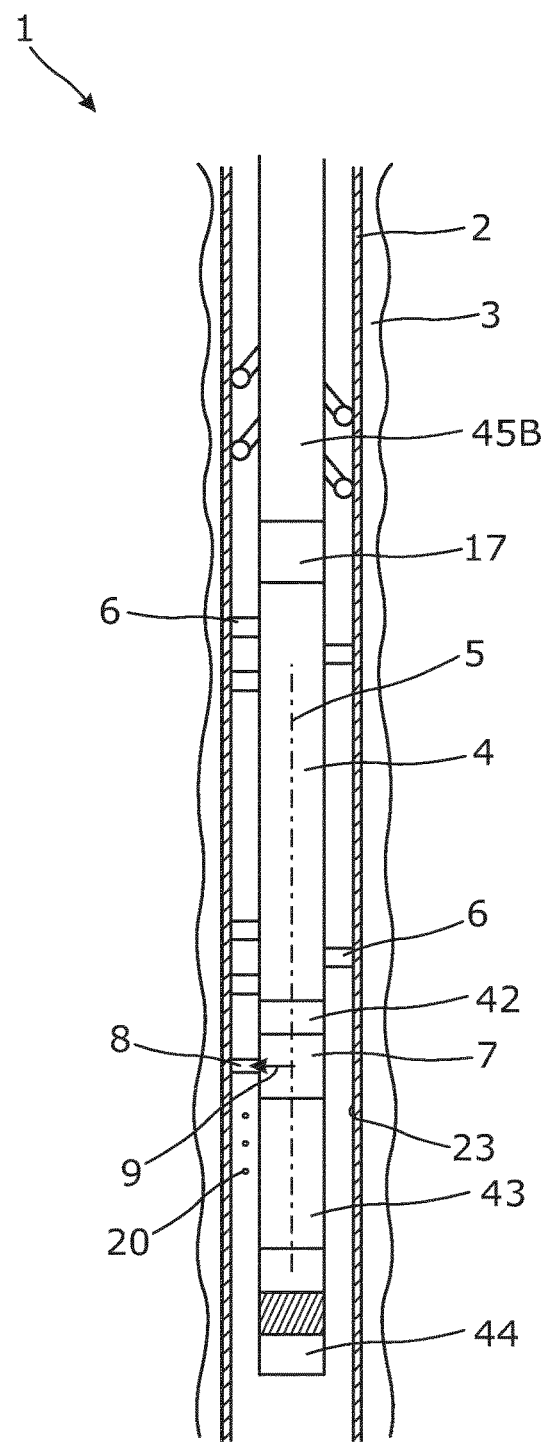
FIG. 9 shows the downhole machining system having a fluid cleaner and a plug setting tool.

As shown in FIG. 9, the downhole machining system comprises a control unit 17 for controlling all the actuators to position the bit initially as well as during the machining operation in the same manner as the well known Computerized Numerically Controlled machines sub surface.

The control unit 17 may also be partly or wholly arranged in the first tool part 4 or the second tool part 7. However, communication downhole may be limited, so by arranging the control unit in the first tool part, the system does not need a lot of commands to run.

Figure 7:
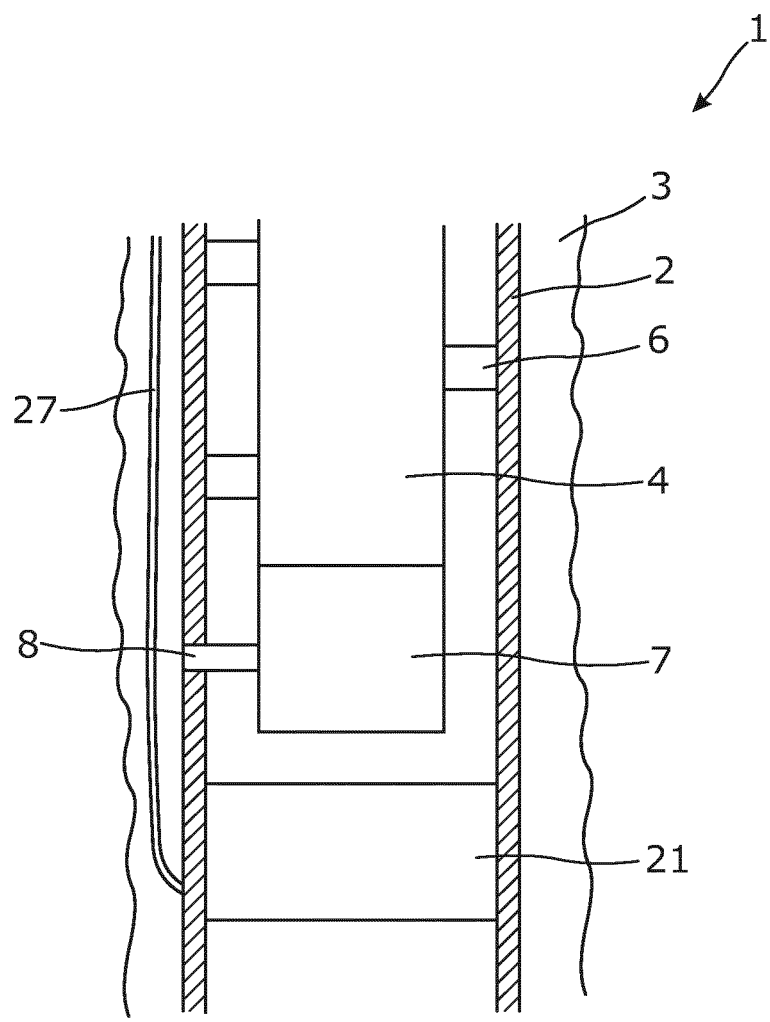
FIG. 7 shows the downhole machining system in a well above a downhole safety valve operated by control lines.
Figure 8:
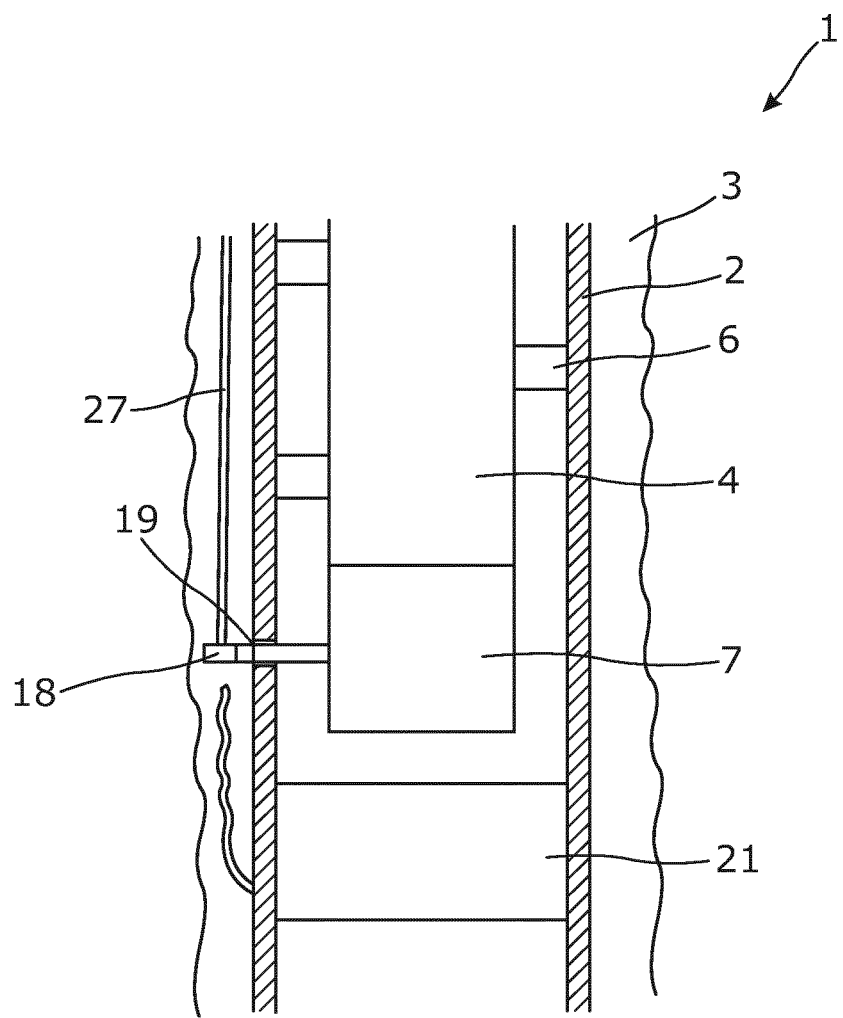
FIG. 8 shows the downhole machining system of FIG. 7 in which the control line is cut.

As seen in FIG. 8, the downhole machining system further comprises a pinching or cutting tool 18 projectable through an opening 19 in the casing provided by the machining bit 8. In FIG. 7, the bit is in the process of making the opening, and in FIG. 8, the cutting or pinching tool 18 has just cut the control line 27 by entering the opening and engaging the control line.

In FIG. 9, the downhole machining system 1 further comprises a bit magazine 42 from which a new bit is collected if the one being used fails. Furthermore, the downhole machining system 1 may have different bits for performing several different machining operations. The downhole machining system further comprises a fluid cleaner 43 for cleaning up the cuttings from the machining process, and a plug setting tool 44 for subsequently setting a plug, so that the well can be cemented shortly after the downhole machining system has been retracted from the well.

In FIG. 10, the bit is rotated via gears by means of a main shaft 25 which is rotated by the motor (shown in FIG. 3). The main shaft is connected with an angular gear for rotating the bit, a first gear of the angular gear being connected to the main shaft and a second gear of the angular gear being connected to a bit housing. The first gear is angled in relation to the second gear and the gears engage each other for rotating the bit housing. The bit housing extends radially in relation to the axial extension of the tool part, and the bit is slidably arranged in the bit housing and engages the bit housing by means of a key and spline connection so that the bit is rotated along with the bit housing. In this way, the bit is movable in the radial direction by means of hydraulics or a motor, while still being rotated by the bit housing and hence by the angular gear and the main shaft 25.

In FIGS. 11A and 11B, the first actuator 10, such as a stroker tool, comprises a hydraulic cylinder instead of a motor. In FIG. 11A, the stroker tool is in its retracted position, and in FIG. 11B the stroker tool is in its projected position, the stroker tool having made a stroke, pushing the second tool part and thus the bit forward in the casing. The first tool part has two anchoring sections 6, 6A, 6B and the second tool part 7 has a rolling, centering anchoring section 6C. As can be seen in FIG. 11C, the rolling, centering anchoring section 6C has rollers 94 so as to support the bit to ensure that while the bit is milling or machining the casing, the bit will still be able to move axially along with a stroke of the stroker tool.

When performing the machining operation, the downhole machining system is firstly submerged into the casing, and when the system is near the predetermined position, the anchors of the anchoring section are projected, anchoring the system in the casing. Secondly, the second tool part 7 is moved in relation to the first tool part 4, positioning the bit at a predetermined location in relation to the wall of the casing, and the machining bit 8 is moved radially in relation to the axial extension, and the machining of the casing is performed by means of the bit. During machining, the second part is moved axially and/or rotated in relation to the first tool part in order to make an elongated opening or an oval or square opening. The machining may be performed to provide an elongated opening in the casing so that an operation tool, such as a pinching or cutting tool 18, can be projected through the opening to cut a control line for operating a safety valve 21 (shown in FIG. 7). The machining is, in this embodiment, conventional milling/up-milling, but in another embodiment, the machining may be down milling/climb milling. In yet another embodiment, the bit may be a rotating disc on a projectable arm.

A stroking tool is a tool providing an axial force. The stroking tool comprises an electrical motor for driving a pump. The pump pumps fluid into a piston housing to move a piston acting therein. The piston is arranged on the stroker shaft. The pump may pump fluid into the piston housing on one side and simultaneously suck fluid out on the other side of the piston.

By fluid or well fluid is meant any kind of fluid that may be present in oil or gas wells downhole, such as natural gas, oil, oil mud, crude oil, water, etc. By gas is meant any kind of gas composition present in a well, completion, or open hole, and by oil is meant any kind of oil composition, such as crude oil, an oil-containing fluid, etc. Gas, oil, and water fluids may thus all comprise other elements or substances than gas, oil, and/or water, respectively.

By a casing is meant any kind of pipe, tubing, tubular, liner, string etc. used downhole in relation to oil or natural gas production.

In the event that the tool is not submergible all the way into the casing, a driving unit 45B, such as a downhole tractor, can be used to push the tool all the way into position in the well, as shown in FIG. 9. The downhole tractor may have projectable arms having wheels, wherein the wheels contact the inner surface of the casing for propelling the tractor and the tool forward in the casing. A downhole tractor is any kind of driving tool capable of pushing or pulling tools in a well downhole, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A downhole machining system for machining a casing in a borehole in a well having a top, comprising:
    a first tool part having an axial extension and an anchoring section to fix the first tool part relative to the casing,
    a second tool part adapted to rotate and move axially in relation to the first tool part, the second tool part comprising a machining bit which is movable in a direction radial in relation to the axial extension,
    a first actuator comprising an electrical motor for axially moving the second tool part in relation to the first tool part,
    a second actuator comprising an electrical motor for rotating the second tool part in relation to the first tool part, and
    a third actuator comprising an electrical motor for rotating the bit,
    wherein at least one of the first, second and third actuators comprises a gear for changing a rotational speed of a rotor of the motor, wherein the bit is moved radially in a bit housing, the bit has a sharp end facing the casing and a piston end, and the bit is moved radially in relation to the axial extension via an electrical motor driving a hydraulic cylinder which is in fluid communication with the bit housing pressing onto the piston end.

2. A downhole machining system according to claim 1, wherein each of the first, second and third actuators includes a gear, wherein the gears for the first and second actuators are reduction gears, and the gear for the third actuator increases the number of rotations of the bit in relation to the electrical motor of the third actuator.

3. A downhole machining system according to claim 1, wherein the first tool part is arranged closer to the top of the well than the second tool part.

4. A downhole machining system according to claim 1, wherein the system comprises a second anchoring section, and the anchoring and second anchoring sections are arranged with a mutual axial distance between them, both the anchoring and second anchoring sections being arranged closer to the top of the well than the second tool part and the bit.

5. A downhole machining system according to claim 4, wherein the anchoring and second anchoring sections are axially relatively movable in relation to one another.

6. A downhole machining system according to claim 1, wherein the gear of the third actuator is a bevel gear.

7. A downhole machining system according to claim 1, wherein the gear of the second actuator is a planetary gear.

8. A downhole machining system according to claim 1, wherein the gear of the first actuator is a planetary gear.

9. A downhole machining system according to claim 1, wherein the bit is moved radially in relation to the axial extension via the electrical motor and hydraulics.

10. A downhole machining system according to claim 1, wherein the bit is moved radially via the hydraulic cylinder.

11. A downhole machining system according to claim 10, wherein the bit forms a piston of the hydraulic cylinder.

12. A downhole machining system according to claim 1, wherein the first actuator comprises a hydraulic cylinder instead of the motor.

13. A downhole machining system according to claim 1, wherein the system comprises a control unit for controlling the first, second and third actuators.

14. A downhole machining system according to claim 1, wherein the system further comprises a pinching or cutting tool projectable through an opening in the casing provided by the machining bit.

15. A downhole machining system according to claim 1, further comprising a fluid cleaner for cleaning up cuttings from the machining process.

16. A downhole machining system according to claim 1, wherein the second tool part with the bit is movable relative to the first tool part such that the bit machines a window of custom geometry in the casing that is not limited in size or shape by a diameter of the bit.

17. A downhole machining system according to claim 1, wherein the first actuator is configured to axially move the second tool part and the bit in relation to the first tool part whilst the bit is machining by virtue of rotation via the third actuator.

18. A downhole machining system according to claim 1, wherein the anchoring section includes a first anchoring section and a second anchoring section axially spaced from the first anchoring section along the axial extension, and the second tool part with the bit is not arranged between the first and second anchoring sections but instead the second tool part and the bit are arranged in cantilever fashion in front of the first and second anchoring sections.

19. A machining method comprising:
   inserting the downhole machining system according to claim 1 into the casing,
   anchoring the system in the casing,
   moving the second tool part in relation to the first tool part,
   moving the machining bit radially in relation to the axial extension, and
   machining the casing via the bit.

20. A machining method according to claim 19, further comprising the step of moving the second tool part and the bit axially and/or rotate the second tool part and the bit during the machining step in order to provide an opening in the casing, said opening being larger than a diameter of the bit.

21. A machining method according to claim 19, wherein the machining step is performed to provide an opening in the casing, and the method further comprises the step of projecting an operation tool into the opening.

\* \* \* \* \*